(12) United States Patent
Kawamoto

(10) Patent No.: US 7,768,726 B2
(45) Date of Patent: Aug. 3, 2010

(54) LENS DRIVE DEVICE

(75) Inventor: Hisashi Kawamoto, Narashino (JP)

(73) Assignee: Seiko Precision, Inc., Chiba (JP)

( * ) Notice: Subject to any disclaimer, the term of this patent is extended or adjusted under 35 U.S.C. 154(b) by 113 days.

(21) Appl. No.: 12/296,906

(22) PCT Filed: Apr. 4, 2007

(86) PCT No.: PCT/JP2007/057554

§ 371 (c)(1),
(2), (4) Date: Oct. 10, 2008

(87) PCT Pub. No.: WO2007/116907

PCT Pub. Date: Oct. 18, 2007

(65) Prior Publication Data

US 2009/0174956 A1    Jul. 9, 2009

(30) Foreign Application Priority Data

Apr. 12, 2006    (JP) .............................. 2006-110166

(51) Int. Cl.
*G02B 7/02* (2006.01)
*G02B 15/14* (2006.01)
(52) U.S. Cl. ....................... 359/823; 359/824; 359/694; 359/695; 359/698; 396/133; 396/144; 396/235; 396/244; 348/335; 348/345; 352/140
(58) Field of Classification Search ......... 359/822–824, 359/381, 672, 694–704; 396/55, 71–75, 396/125, 131, 133, 144, 179, 235, 239, 244, 396/295, 335, 337, 340, 349, 354, 411, 502; 348/208.99, 335, 345, 362, E5.028; 352/140, 352/218
See application file for complete search history.

(56) References Cited

U.S. PATENT DOCUMENTS 3,370,907 A * 2/1968 Cox et al. .................... 352/140
3,528,628 A * 9/1970 Wangerin ................ 242/332.7

(Continued)

FOREIGN PATENT DOCUMENTS

JP         09-032902         2/1997

(Continued)

*Primary Examiner*—Loha Ben
(74) *Attorney, Agent, or Firm*—Howard & Howard Attorneys PLLC

(57) ABSTRACT

A lens drive device capable of preventing a lens holder from inclining with respect to the optical axis direction of a lens is provided. A first gear (13), a second gear (14), a protrusion (20a), and a coil spring (6) are coaxially supported by a shaft (5), which is a fixed shaft. The rotational motion is transmitted to a two-stage gear (12) by rotating a rotor (11a) of a step motor (11) clockwise or counterclockwise. The rotational motion of the two-stage gear (12) is in turn transmitted to the first gear (13) and the second gear (14). When the first gear (13) and the second gear (14) rotate, the degree of engagement between an internally threaded portion (131a) of the first gear (13) and an externally threaded portion (141a) of the second gear (14) increases, and the second gear (14) moves upward. As the second gear (14) moves upward, a lens holder (20), urged upward by the elastic force of the coil spring (6), moves upward along the optical axis of a lens (21).

7 Claims, 4 Drawing Sheets

U.S. PATENT DOCUMENTS

| | | | |
|---|---|---|---|
| 3,533,347 A * | 10/1970 | Gensike et al. | 396/235 |
| 5,115,348 A * | 5/1992 | Notagashira | 359/697 |
| 5,198,932 A * | 3/1993 | Takamura | 359/694 |
| 5,264,963 A * | 11/1993 | Ueyama | 359/695 |
| 5,696,634 A * | 12/1997 | Watanabe et al. | 359/694 |
| 5,745,802 A * | 4/1998 | Imura | 396/55 |
| 5,748,391 A * | 5/1998 | Tanaka et al. | 359/813 |
| 7,019,915 B2 * | 3/2006 | Sakamoto | 359/695 |
| 7,280,278 B2 * | 10/2007 | Boettiger et al. | 359/619 |

FOREIGN PATENT DOCUMENTS

| | | |
|---|---|---|
| JP | 2000-193877 | 7/2000 |
| JP | 2002-184066 | 6/2002 |
| JP | 2006-293263 | 10/2006 |

* cited by examiner

LENS DRIVE DEVICE

TECHNICAL FIELD

The present invention relates to a lens drive device with a reduction mechanism.

BACKGROUND ART

For example, Patent Literature 1 discloses a lens drive device of an optical equipment. This device is provided with a rotational shaft having an externally threaded portion and a cylindrical portion formed on the outer circumference thereof, a supporting portion which supports each end of the rotational shaft, a gear fixed to the rotational shaft, a motor which is connected to a drive gear meshing the foregoing gear and rotationally drives the rotational shaft, a lens holder having a tubular portion whose inner circumference surface is disposed with an internally threaded portion engaging with the externally threaded portion of the rotational shaft and a fitting portion which slidably contacts the cylindrical portion of the rotational shaft, a guide shaft provided in parallel with the rotational shaft which supports the lens holder together with the rotational shaft, and a spring urging the rotational shaft to the supporting portion. The lens holder is supported by the rotational shaft via the tubular portion. Furthermore, the tubular portion is the portion of the lens holder that is driven during movement of the lens holder.

The lens drive device rotationally drives the motor and rotates the rotational shaft via the drive gear and via the gear, so as to move the lens holder along the optical axis direction of the lens while guiding the lens holder along the guide shaft via the tubular portion by engagement between an externally threaded portion of the rotational shaft and an internally threaded portion of the tubular portion of the lens holder.
Patent Literature 1: Unexamined Japanese Patent Application KOKAI Publication No. H09-32902 (FIG. 7)

DISCLOSURE OF INVENTION

Problem to be Solved by the Invention

The rotational shaft of the above-mentioned lens drive device disclosed in Patent Literature 1 needs to be smoothly rotated. The rotational shaft includes, therefore, a fit backlash in a supporting hole of the supporting portion supporting the rotational shaft.

Furthermore, a rather large clearance needs to be provided in the lens drive device between an externally threaded portion of the rotational shaft and an internally threaded portion of the tubular portion of the lens holder so as to move the tubular portion of the lens holder on the rotational shaft.

For this reason, when moving the lens holder by rotating the rotational shaft of the lens drive device, the lens holder is inclined with respect to the optical axis direction of the lens. As a result, the quality of an image taken by the lens drive device is deteriorated.

The present invention is directed to solving the above-described problem, and it is an object of the present invention to provide a lens drive device which is capable of preventing a lens holder from inclining with respect to the optical axis direction of a lens.

Means for Solving the Problem

In order to achieve the above-mentioned object, a lens drive device of the present invention, which moves a lens holder retaining a lens along the optical axis direction of the lens, is characterized in comprising: two gears being simultaneously rotated at different rotational speeds; motion direction converting means for causing one of the two gears to rectilinearly move along the optical axis direction of the lens using the rotational speed difference between the two gears and rotational motions thereof; a driven portion being provided at the lens holder, abutting the rectilinearly moving gear, and following the movement of the rectilinearly moving gear along the optical axis direction; an urging member which urges the driven portion to the side of the rectilinearly moving gear; and a fixing shaft which coaxially supports the two gears, the driven portion, and the urging member.

The motion direction converting means of the lens drive device of the present invention may comprise: an externally threaded portion provided on one of the two gears; and an internally threaded portion provided on the other gear and engaged to the externally threaded portion.

In this embodiment, in particular, the externally threaded portion may be formed on the outer circumference surface of a boss portion formed at the center of the one of the two gears, and the internally threaded portion may be formed on the inner circumference surface of a penetration hole formed at the center of the other gear.

Furthermore, in the lens drive device of the present invention, the first group of gears comprise the two gears; and the first group of gears may be rotated via the second group of gears comprising two gears, each of which meshes the two gears comprised in the first group of gears.

In this embodiment, when the number of teeth of one of the two gears of the first group of gears and the number of teeth of the other gear of the first group are m and n, respectively, the number of teeth of one of the two gears of the second group of gears that meshes one of the two gears of the first group of gears and the number of teeth of the other gear of the second group of gears that meshes the other gear of the first group of gears may be n and m, respectively.

Furthermore, in the lens drive device of the present invention, the lens holder may have a substantially cylindrical shape; and the driven portion may include a protrusion provided in such a way as to be protruded to a side wall of the lens holder.

In this embodiment, a rotation stopping portion which prevents rotational motion of the lens holder may be provided on the side wall of the lens holder.

EFFECT OF THE INVENTION

According to the present invention, a lens drive device capable of preventing a lens holder from inclining with respect to the optical axis direction of a lens can be provided.

Figure 1:
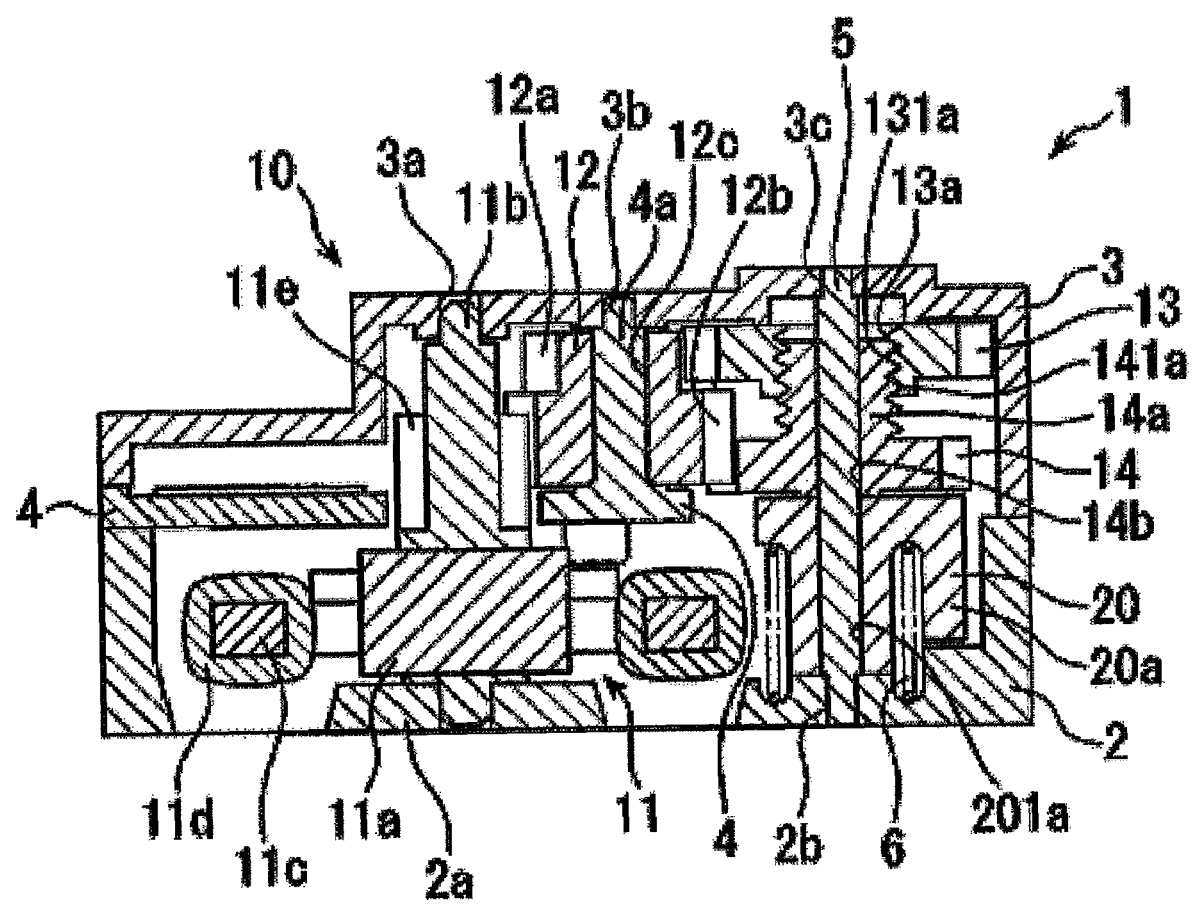
FIG. 1 presents a configuration of the lens drive device according to an embodiment of the present invention as well as a cross-sectional view showing a lens holder being positioned on the lower side.

EXPLANATION OF REFERENCE NUMERALS 1 lens drive device
5 shaft
6 coil spring
1 drive portion
1 electro-magnetic actuator (step motor)
12 two-stage gear
12a small diameter gear
12b large diameter gear
13 first gear
131a internally threaded portion
14 second gear
141a externally threaded portion
20 lens holder
20a protrusion
21 lens

BEST MODE FOR CARRYING OUT THE INVENTION

Figure 2:
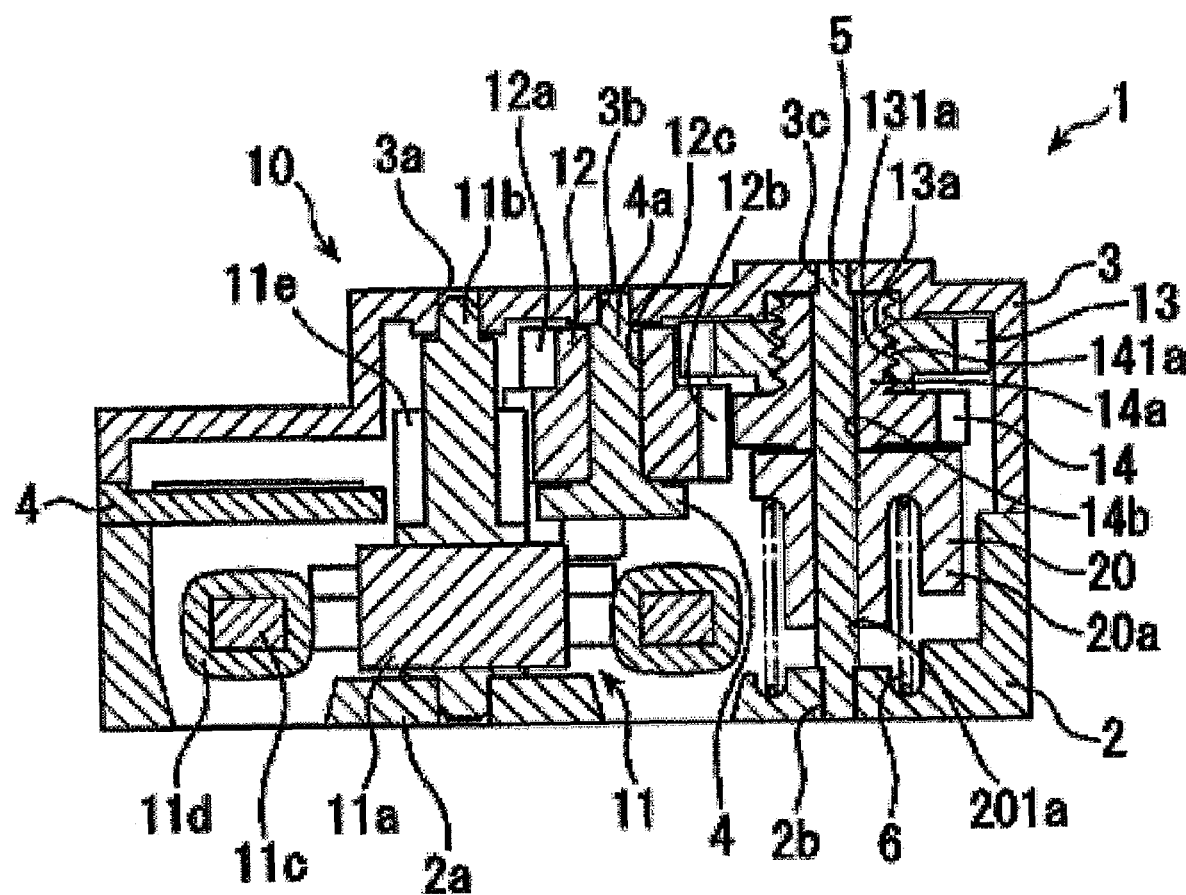
FIG. 2 presents a cross-sectional view showing a lens holder being positioned on the upper side of the lens drive device illustrated in FIG. 1.
Figure 3:
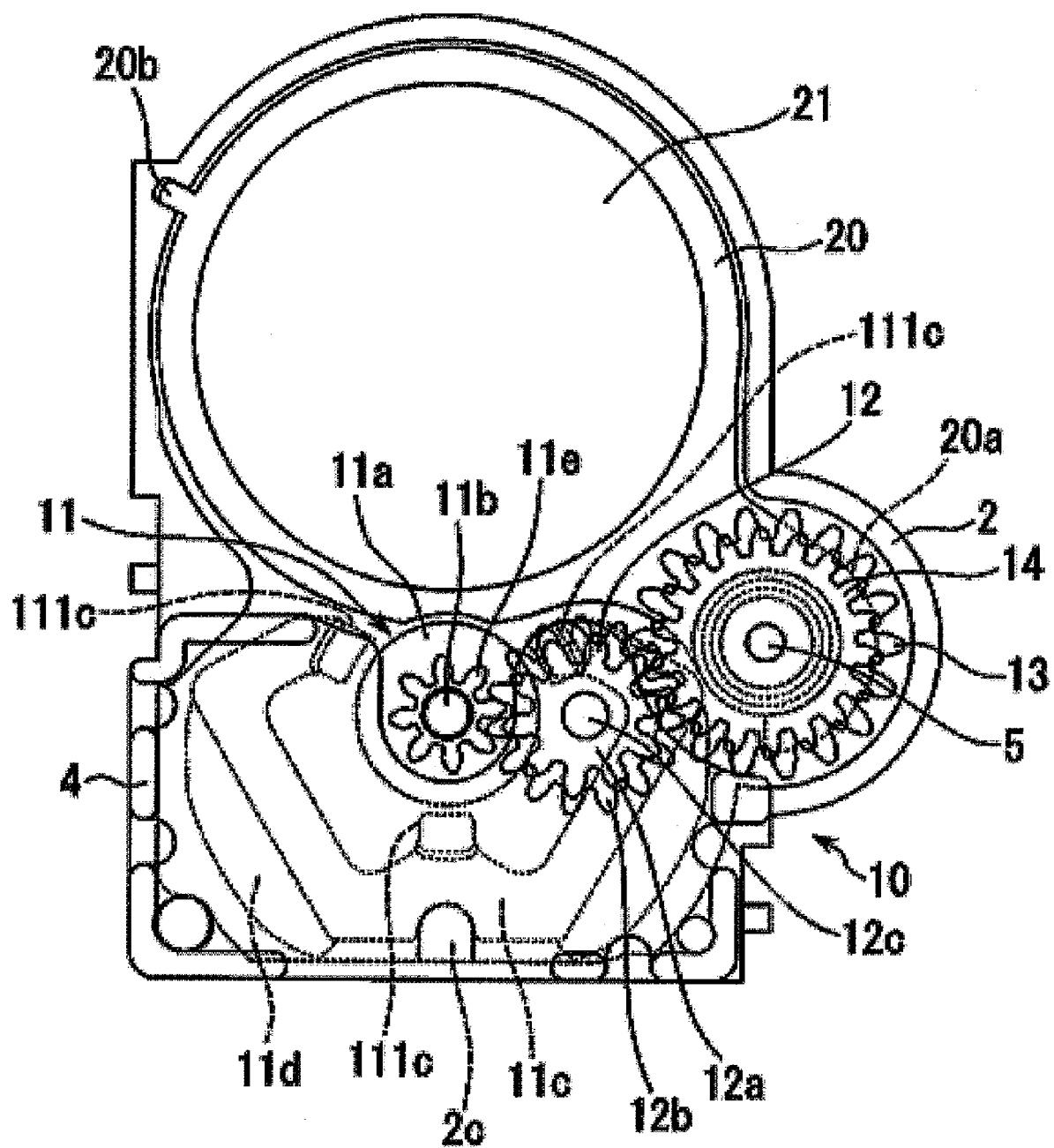
FIG. 3 presents a plan view showing the overall configuration of the lens drive device illustrated in FIG. 1.

A lens drive device according to an embodiment of the present invention is to be hereinafter explained with reference to the drawings. A lens drive device 1 has a mechanism of moving a lens 21 retained in a lens holder 20 in the optical axis direction of the lens 21. Further, the lens holder 20 has a substantially cylindrical shape as illustrated in FIGS. 1 to 3. The lens 21 is built inside this cylindrical shaped portion as illustrated in FIG. 3.

The lens drive device 1 is provided with a drive portion 10 having a step motor 11, which is an electro-magnetic actuator, and the lens holder 20 driven by the drive portion 10 in a first case 2 and a second case 3 which constitute a pair of upper and lower cases as illustrated in FIG. 1. Further, a middle board 4 is provided between the first case 2 and the second case 3.

The drive portion 10 has a reduction mechanism as illustrated in FIGS. 1 and 2. The drive portion 10 is provided with the step motor 11, a two-stage gear 12 meshing a pinion 11e of the step motor 11, and a first gear 13 and a second gear 14 each meshing the two-stage gear 12.

The step motor 11 moves the lens holder 20 along the optical axis direction via a group of gears such as the two-stage gear 12, by rotationally moving a rotor 11a. The step motor 11 is provided with the rotor 11a, a rotor shaft 11b, a stator 11c, a coil 11d, and the pinion 11e.

The rotor 11a rotationally moves around the rotor shaft 11b as a center, by rotary torque generated by magnetic force between the rotor 11a and the stator 11c. For example, the rotor 11a is made from magnetic materials such as rare earths and ferrous materials, and is formed into a circular disc or a cylinder with a small diameter. The rotor 11a includes a plurality of magnetic poles whose polarities alternate in the rotational direction. These magnetic poles are provided at a regular interval in the rotational direction of the rotor 11a.

Both the rotor shaft 11b and the pinion 11e are integrally formed by insert molding in which the rotor 11a is set to a die and injection molding is performed for the rotor shaft 11b and the pinion 11e. Further, if the rotor shaft 11b and the pinion 11e are treated as independent articles, the pinion 11e may be fitted and fixed to the rotor shaft 11b. The rotor 11a, the rotor shaft 11b, and the pinion 11e may also be integrally molded with the same materials. One end of the rotor shaft 11b is rotatably supported by a bearing portion 2a of the first case 2. Further, the other end of the rotor shaft 11b is rotatably supported by a bearing portion 3a of the second case 3. The pinion 11e rotates along with the rotor 11a and the rotor shaft 11b to transmit rotational motion to the two-stage gear 12.

The stator 11c is employed for leading the magnetic flux of the excited coil 11d to the magnetized magnetic poles of the rotor 11a. For example, the stator 11c is made from soft magnetic materials such as iron and permalloy. The stator 11c is formed of three pole teeth 111c which are magnetized by energizing the coil 11d as illustrated in FIG. 3. The pole teeth 111c are disposed so as to face magnetic poles provided at the rotor 11a. Furthermore, the stator 11c is positioned at a mounting portion 2c of the first case 2 or the like.

After the coil 11d is applied with a positive or negative voltage and excited, the coil 11d magnetizes the stator 11c. The coil 11d comprises a pair of coils wound around the stator 11c. Further, the coil 11d is connected to an unshown terminal board.

The step motor 11 generates an attractive or repulsive force between a pole gear of the magnetized stator 11c and each magnetic pole of the rotor 11a, by applying a positive or negative voltage to the coil 11d for excitation thereof, generates rotary torque at the rotor 11a, and rotates the rotor 11a clockwise or counterclockwise.

The two-stage gear 12 meshes the pinion 11e, the first gear 13, and the second gear 14 to transmit the rotational motion of the rotor 11a of the step motor 11 to the first gear 13 and the second gear 14. Gears are coaxially and integrally formed in the two stages of the two-stage gear 12. The two-stage gear 12 comprises a small diameter gear 12a and a large diameter gear 12b, and the number of teeth of the latter is greater than that of the former. A penetration hole 12c is formed at the center of the two-stage gear 12. A shaft 4a of the two-stage gear 12 is erected on the middle board 4. An end portion of the shaft 4a is fitted and fixed to a shaft hole 3b of the second case 3. The two-stage gear 12 is rotatably supported by the shaft 4a in such a way that the small diameter gear 12a is disposed on the upper side and the large diameter gear 12b is disposed on the lower side as illustrated in FIG. 1. Further, the small diameter gear 12a is meshed to the first gear 13. The large diameter gear 12b is meshed to the pinion 11e and to the second gear 14.

The first gear 13 and the second gear 14 use motion direction converting units 131a and 141a, respectively, to convert their respective rotational motions into rectilinear motions and to transmit the rectilinear motions to the lens holder 20. The first gear 13 is a large diameter gear having a large number of teeth. The second gear 14 is a small diameter gear, the number of whose teeth is smaller than that of the first gear 13. The first gear 13 includes an internally threaded portion 131a formed on the inner circumference surface of a penetration hole 13a, which is at the center of the first gear 13. The second gear 14 includes an externally threaded portion 141a formed on the outer circumference surface of the boss portion 14a, which is formed at the center of the second gear 14.

Further, a penetration hole 14b is formed at the center of the boss portion 14a of the second gear 14.

When the number of teeth meshing the two-stage gear 12 is appropriately set for the first gear 13 and the second gear 14, the reduction ratios of the first gear 13 and the second gear 14 may be increased with respect to the number of rotations of the rotor 11a even though the relative motion angles of the first gear 13 and the second gear 14 are equal. In this embodiment, a combination of higher torque having a larger reduction ratio is adopted. In this way, the lens holder 20 can smoothly be moved even with adopting a small size motor having small torque. Because a small size motor having small torque can be adopted, electric power saving for a camera can be achieved.

A shaft 5, to which the penetration hole 14b of the second gear 14 is inserted and fitted, is fixed with one of its ends fitted to a shaft hole 2b of the first case 2 and the other end fitted to a shaft hole 3c of the second case 3. Further, because the shaft 5 is a fixed shaft, the shaft 5 does not have a fixing backlash in the shaft hole 2b and within the shaft hole 3c.

The first gear 13 and the second gear 14 are coaxially placed on the shaft 5 with the internally threaded portion 131a and the externally threaded portion 141a engaged with each other. Because the shaft 5 does not have a screw portion such as a screw, a clearance between the second gear 14 and the shaft 5 needs to be only wide enough to allow movement in the longitudinal direction of the shaft. When moving the second gear 14 in the longitudinal direction of the shaft using a screw or the like, the clearance of a screw portion would be wider than one provided on a shaft having no screw portion. Thus, the configuration in this embodiment in which the second gear 14 is provided on the shaft 5 can decreases inclination with respect to the optical axis direction due to a backlash of the lens holder 20 and therefore improves image quality. The first gear 13 and the second gear 14 are independently rotatable. The degree of engagement between the internally threaded portion 131a and the externally threaded portion 141a can be varied according to a rotational speed difference between the first gear 13 and the second gear 14. Thus, the second gear 14 is movable in the longitudinal direction of the shaft.

The lens holder 20 retains a lens 21. The lens holder 20 includes the protrusion 20a protrudedly formed on the side wall. A penetration hole 201a is formed on the protrusion 20a in the direction orthogonal to the surface of the lens 21. The shaft 5 is inserted and fitted into the penetration hole 201a. The protrusion 20a abuts the second gear 14. The protrusion 20a is coaxially placed on the shaft 5 such that movement is possible in the longitudinal direction of the shaft, and serves as a driven portion of the lens holder 20. Further, a rotation stopper 20b for controlling rotational movement of the lens holder 20 is formed on the outer circumference of the lens holder 20.

There is no engagement between screw portions of the protrusion 20a and the shaft 5. Thus, a large clearance does not need to be provided between the screw portions. Therefore, inclination with respect to the optical axis direction due to a backlash of the lens holder 20 can be minimized.

A coil spring 6 is an elastic member to be attached between the first case 2 and the protrusion 20a of the lens holder 20. The coil spring 6 urges the protrusion 20a toward the second gear 14 side in such a way that the protrusion 20a moves in concert with the second gear 14 in the longitudinal direction of the shaft.

The first gear 13, the second gear 14, the protrusion 20a, and the coil spring 6 are coaxially provided on the shaft 5.

Further, the lens drive device 1 is provided with parts which constitute an unshown optical system. For example, unshown imaging elements are provided on a substrate at a position facing the lens 21 which is retained by the lens holder 20.

Next, a method of causing the lens holder 20 to move along the optical axis direction of the lens 21 in the lens drive device 1 is explained. When the lens holder 20 is positioned on the lower side, which is the first case 2 side (FIG. 1), the rotational motion is transmitted to the two-stage gear 12 via the pinion 11e by rotating the rotor 11a of the step motor 11 clockwise or counterclockwise.

The rotational motion of the two-stage gear 12 is transmitted from the small diameter gear 12a and the large diameter gear 12b to the first gear 13 and the second gear 14, respectively. The first gear 13 and the second gear 14 are simultaneously rotated. The rotational speed of the second gear 14 is faster (rotational angle is larger) than that of the first gear 13.

As shown in FIG. 2, the degree of engagement increases between the internally threaded portion 131a of the first gear 13 and the externally threaded portion 141a of the second gear 14. Accordingly, the second gear 14 moves upward.

Along with the upward movement of the second gear 14, the protrusion 20a of the lens holder 20, which abuts the second gear 14, moves in concert with the movement of the second gear 14 by the urging force of the coil spring 6. The lens holder 20 moves upward along the optical axis of the lens 21.

Furthermore, by rotating the rotor 11a of the step motor 11 toward the reverse direction, the pinion 11e, the two-stage gear 12, the first gear 13, and the second gear 14 rotate toward the reverse direction. The second gear 14 moves downward as shown in FIG. 1. Along with the downward movement of the second gear 14, the protrusion 20a of the lens holder 20, which abuts the second gear 14, is pressed to move downward by the second gear 14, even with the presence of the urging force of the coil spring 6 resisting thereagainst. The lens holder 20 moves downward along the optical axis of the lens 21.

Figure 4:
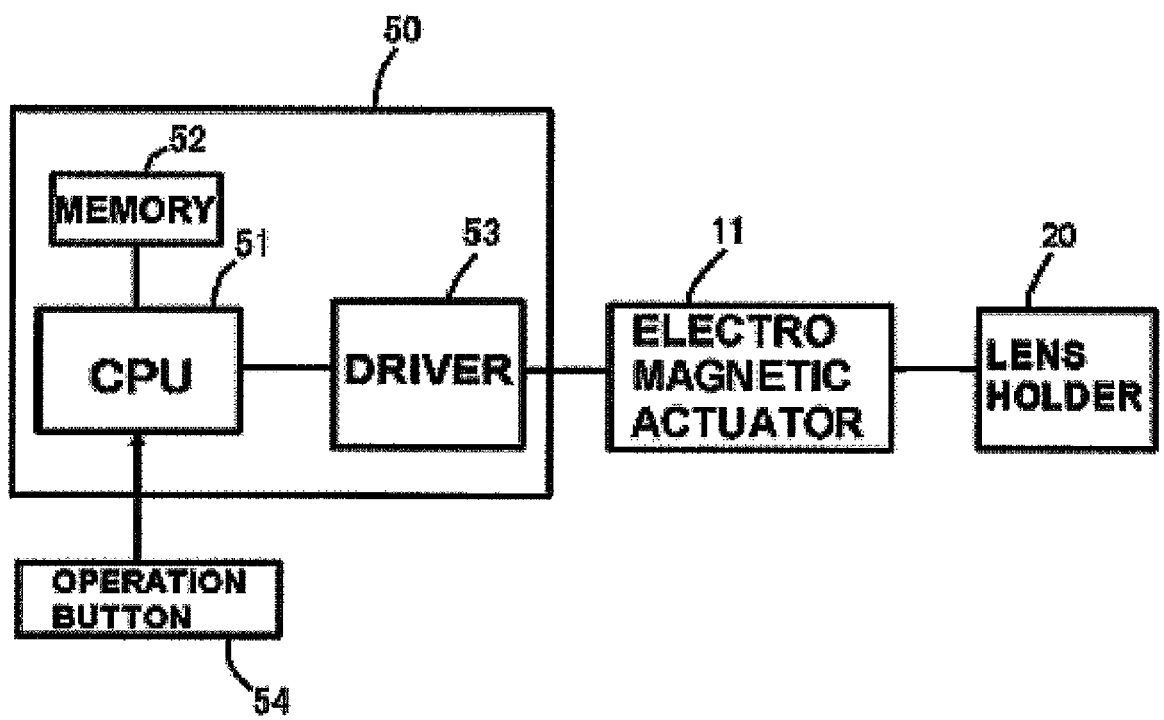
FIG. 4 presents a block diagram of a control circuit for controlling the lens drive device illustrated in FIG. 1.

Here, a control circuit for controlling the lens drive device 1 is explained using FIG. 4. A control unit 50 comprises a CPU (Central Processing Unit) 51, a memory 52, and a driver 53 as shown in FIG. 4. The CPU 51 performs an overall control of the lens drive device 1 and an operation process. The memory 52 stores control information and a program for controlling the lens drive device 1. The driver 53 applies a positive or negative pulsed drive voltage to the coil 11d and excites the coil 11d according to a control signal from the CPU 51. The CPU 51 is connected to an operation button 54.

When the operation button 54 is pressed, the CPU 51 instructs the driver 53 to output a positive or negative voltage for driving the step motor 11. Following the instruction, the driver 53 applies a positive or negative voltage to the coil 11d of the step motor 11. In this way, by controlling energization to the coil 11d of the step motor 11, the rotor 11a of the step motor 11 is rotated clockwise or counterclockwise. As a result, by moving the lens holder 20 along the optical axis direction of the lens 21 as described above, focusing can be performed.

In this way, in the lens drive device 1 in this embodiment, a rotational angle difference (rotational speed difference) between the first gear 13 and the second gear 14 is converted into a distance of movement in the longitudinal direction of the shaft by the motion direction converting units 131a and 141a, which are engaged with each other. As a result, rotational motion is converted into rectilinear motion. The lens holder 20 is also made movable along the optical axis direction of the lens 21. Therefore, the shaft 5 may be a fixed shaft that coaxially supports the first gear 13, the second gear 14, the protrusion 20a of the lens holder 20, and the coil spring 6.

Therefore, unlike the conventional method, the shaft 5 does not need to include a fitting backlash in this embodiment. Thus, inclination of the lens holder 20 with respect to the optical axis direction of the lens 21, which is caused by the fitting backlash of the shaft 5, can be prevented.

Further, unlike the conventional method, a screw portion engaging with a driven target and the like do not need to be formed on the shaft 5 in this embodiment. Therefore, inclination of the lens holder 20 with respect to the optical axis direction of the lens 21, which is caused by a large clearance between screw portions, can be prevented.

Furthermore, in this embodiment, downsizing and electric power saving are facilitated. Drive noise can be made silent.

Lowering cost is made possible because the number of parts is reduced. A high-accuracy drive can be achieved by a large reduction ratio. The ease of design is enhanced as well.

Furthermore, particularly in this embodiment, the protrusion 20a is formed on a side wall of the substantially cylinder-shaped lens holder 20. Because this protrusion 20a also serves as a driven part, the layout of elements (particularly, the step motor 11 and the lens holder 20) constituting the lens drive device 1 can optimally be determined. This embodiment also greatly contributes to downsizing the device as a whole.

Furthermore, particularly in this embodiment, the protrusion 20a abuts the rotating second gear 14. Thus, the lens holder 20 possibly rotates around a certain part of the protrusion 20a part as a center. In this embodiment, however, the rotation stopper 20b is formed as previously being described (refer to FIG. 3). Thus, occurrence of such an undesirable event is prevented. Furthermore, this rotation stopper 20b also greatly contributes to stabilizing the rectilinear motion of the lens holder 20 along the optical axis direction of the lens 21, as can be clearly seen in FIG. 3.

As above, the present invention is explained with reference to the embodiment. However, the present invention is not limited to the above-mentioned embodiment and may be widely variable.

An example of this embodiment, where the pinion 11e is integrally formed on the rotor shaft 11b of the step motor 11 and the two-stage gear 12 meshing this pinion 11e is used, has been explained. However, a two-stage gear may be provided directly on the rotor shaft 11b in place of the pinion 11e. Further, an example of using the integrally formed two-stage gear 12 in this embodiment has been explained. However, two kinds of independent gears may be used in place of the two-stage gear 12.

Further, an example of using the step motor 11 as one driving source in this embodiment has been explained. However, the driving source only needs to be a driving source for generating rotational motion and, thus, is not limited to the step motor 11.

Furthermore, an example of using the two-stage gear 12 comprising the small diameter gear 12a and the large diameter gear 12b as well as the first gear 13 and the second gear 14 in this embodiment has been explained. For example, however, when the number of teeth of the first gear 13 and the number of teeth of the second gear 14 are m and n, respectively, a setting may be constructed so that the number of teeth of the gear that meshes the first gear 13 and the number of teeth of the gear that meshes the second gear 14 are n and m, respectively, for the sake of design. In this way, the ease of design increases, and a drive target can be effortlessly controlled.

Furthermore, if the number of teeth of the first gear 13, the number of teeth of the second gear 14, the number of teeth of the gear meshing the first gear 13, and the number of teeth of the gear meshing the second gear 14 are set to b, c, d and e, respectively, combinations of gears needs to be made so that c/e does not agree with b/d. This is because such combinations of gears generate a rotational speed difference between the first gear 13 and the second gear 14, thereby causing the drive target to be driven.

The present application is based on Japanese Patent Application No. 2006-110166 filed on Apr. 12, 2006. The specification, the claims, and the drawings as a whole shall be incorporated herein by reference.

INDUSTRIAL APPLICABILITY

The lens drive device according to the present invention is applicable to various types of electronic photography equipment, such as handy camera and cellular phone, which can capture the external things by using a lens.

The invention claimed is:

1. A lens drive device which moves a lens holder retaining a lens along an optical axis direction of the lens, comprising:
    two gears being simultaneously rotated at different rotational speeds;
    motion direction converting means for causing one of the two gears to rectilinearly move along the optical axis direction of the lens using a rotational speed difference between the two gears and rotational motions thereof;
    a driven portion being provided at the lens holder, abutting the rectilinearly moving gear, and following a movement of the rectilinearly moving gear along the optical axis direction;
    an urging member which urges the driven portion to the side of the rectilinearly moving gear; and
    a fixing shaft which coaxially supports the two gears, the driven portion, and the urging member.

2. The lens drive device according to claim 1, wherein:
    the motion direction converting means comprises:
    an externally threaded portion provided on the one of the two gears; and
    an internally threaded portion provided on the other gear and engaged to the externally threaded portion.

3. The lens drive device according to claim 2, wherein:
    the externally threaded portion is formed on an outer circumference surface of a boss portion formed at a center of the one of the two gears; and
    the internally threaded portion is formed on an inner circumference surface of a penetration hole formed at a center of the other gear.

4. The lens drive device according to claim 1, wherein:
    a first group of gears comprises the two gears; and
    the first group of gears is rotated via a second group of gears comprising two gears, each of which meshes the two gears comprised in the first group of gears.

5. The lens drive device according to claim 4, wherein:
    when the number of teeth of one of the two gears of the first group of gears and the number of teeth of the other gear of the first group of gears are m and n, respectively, the number of teeth of one of the two gears of the second group of gears that meshes one of the two gears of the first group of gears and the number of teeth of the other gear of the second group of gears that meshes the other gear of the first group of gears are n and m, respectively.

6. The lens drive device according to claim 1, wherein:
    the lens holder has a substantially cylindrical shape; and
    the driven portion includes a protrusion provided in such a way as to be protruded to a side wall of the lens holder.

7. The lens drive device according to claim 6, wherein:
    a rotation stopping portion which prevents rotational motion of the lens holder is provided on the side wall of the lens holder.

* * * * *